United States Patent
Kogan-Katz et al.

(10) Patent No.: US 10,067,855 B2
(45) Date of Patent: Sep. 4, 2018

(54) ERROR DEVELOPER ASSOCIATION

(71) Applicant: Hewlett-Packard Development Company, L.P., Houston, TX (US)

(72) Inventors: Olga Kogan-Katz, Yehud (IL); Ira Cohen, Modiin (IL); Ohad Assulin, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 180 days.

(21) Appl. No.: 14/761,359

(22) PCT Filed: Jan. 31, 2013

(86) PCT No.: PCT/US2013/024081
§ 371 (c)(1),
(2) Date: Jul. 16, 2015

(87) PCT Pub. No.: WO2014/120192
PCT Pub. Date: Aug. 7, 2014

(65) Prior Publication Data
US 2015/0355998 A1    Dec. 10, 2015

(51) Int. Cl.
*G06F 9/44* (2018.01)
*G06F 11/36* (2006.01)
(Continued)

(52) U.S. Cl.
CPC ............ *G06F 11/3664* (2013.01); *G06F 8/70* (2013.01); *G06F 8/71* (2013.01); *G06F 11/366* (2013.01)

(58) Field of Classification Search
CPC . G06F 8/70; G06F 8/71; G06F 11/366; G06F 11/3664
See application file for complete search history.

(56) References Cited

U.S. PATENT DOCUMENTS 7,137,100 B2 * 11/2006 Iborra ...................... G06F 8/30
717/106
7,216,336 B1    5/2007 Ezra et al.
(Continued)

FOREIGN PATENT DOCUMENTS

WO    WO-2007019214 A2    2/2007
WO    WO-2007087136 A2    8/2007
WO    WO-2012066091 A1    5/2012

OTHER PUBLICATIONS

Yichen Xie and Dawson Engler, Using Redundancies to Find Errors, ACM, 2002, retrieved online on Apr. 23, 2018, pp. 51-60. Retrieved from the Internet: <URL: http://delivery.acm.org/10.1145/590000/587060/p51-xie.pdf?i>. (Year: 2002).*

(Continued)

*Primary Examiner* — Hanh T. Bui

(57) ABSTRACT

Systems, methods, and machine-readable and executable instructions are provided for error developer association. Error developer association can include identifying a number of portions of the source code associated with a message, wherein the message is associated with an error. Error developer association can also include associating a developer with a portion of the source code of the number of portions of the source code. Error developer association can also include identifying a developer of the number of developers to resolve the error.

10 Claims, 3 Drawing Sheets

(51) Int. Cl.
*G06F 8/70* (2018.01)
*G06F 8/71* (2018.01)

(56) References Cited

U.S. PATENT DOCUMENTS

| | | | |
|---|---|---|---|
| 8,091,074 | B2 | 1/2012 | Lyon-Smith |
| 9,069,568 | B2* | 6/2015 | Schmidt .................. G06F 8/427 |
| 2004/0019835 | A1 | 1/2004 | Marisetty et al. |
| 2006/0248406 | A1 | 11/2006 | Qing et al. |
| 2007/0250816 | A1* | 10/2007 | Rose ....................... G06Q 10/06 717/124 |
| 2009/0070734 | A1 | 3/2009 | Dixon et al. |
| 2009/0132995 | A1* | 5/2009 | Iborra ........................ G06F 8/30 717/106 |
| 2010/0211932 | A1* | 8/2010 | Jones .................. G06F 11/3624 717/124 |

OTHER PUBLICATIONS

Bhattacharya, P. et al., "Automated, Highly-accurate, Bug Assignment Using Machine Learning and Tossing Graphs," (Research Paper), May 2, 2012, 37 pages.

Denissov, A., "Integration of Coverity and Subversion," (Web Page), Jun. 6, 2012, available at https://communities.coverity.com/thread/2418.

International Search Report & Written Opinion received in PCT Application No. PCT/US2013/024081, dated Oct. 28, 2013, 12 pages.

Servant, F. et al., "Whosefault Automatic Developer-to-fault Assignment Through Fault Localization," (Research Paper), 34th International Conference on Software Engineering, Jun. 2-9, 2012, pp. 36-46.

* cited by examiner

ERROR DEVELOPER ASSOCIATION

BACKGROUND

An application goes through different lifecycle stages as its content is transformed from source code implemented by a developer, through build artifacts created by a build management system, to deployment artifacts used when an application is instantiated. Developers create logs in order to record runtime information and create an audit trail that can be used later on to understand the runtime behavior of the software or help to diagnose and troubleshoot a problem. Unexpected faults usually produce exceptions which are recorded in the logs as well. Once a problem is detected in the production environment using logs and diagnosed as a source code problem, it is assigned to a developer to fix it.

DETAILED DESCRIPTION

Information technology (IT) environments associated with application development can be complex. The growth in complexity of IT environments can be exacerbated by IT infrastructures becoming increasingly modular, redundant, distributed, and/or dynamic. IT environments must account for development process complexity as well as the trend toward agile development and frequent delivery of high-quality applications.

Large numbers of application developers can frequently be involved in a single development project to meet the growing demands. The application developers of a project are often distributed in different geographies, yet, must work together to quickly deliver new applications and services. Managing this arrangement demands significant coordination and communication between development and operations teams.

As an application goes through different lifecycle stages (e.g. source code, build artifacts, deployment package, application instances, etc.) its content is transformed from source code implemented by the developers, through build artifacts created by the build management system, to deployment artifacts that are used when an application is instantiated in the production environment.

Once a problem is detected in the production environment by IT operation team, error log messages can be collected manually by application support teams and/or automatically using, for example, log analytics tools.

By associating an application developer with an error as taught in the present disclosure, collaboration between operations and development teams can be improved. As a result, time to problem resolution can be reduced.

In the present disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

As used herein, "a" or "a number of" an element and/or feature can refer to one or more of such elements and/or features. Further, where appropriate, as used herein, "for example" and "by way of example" should be understood as abbreviations for "by way of example and not by way of limitation."

Figure 1:
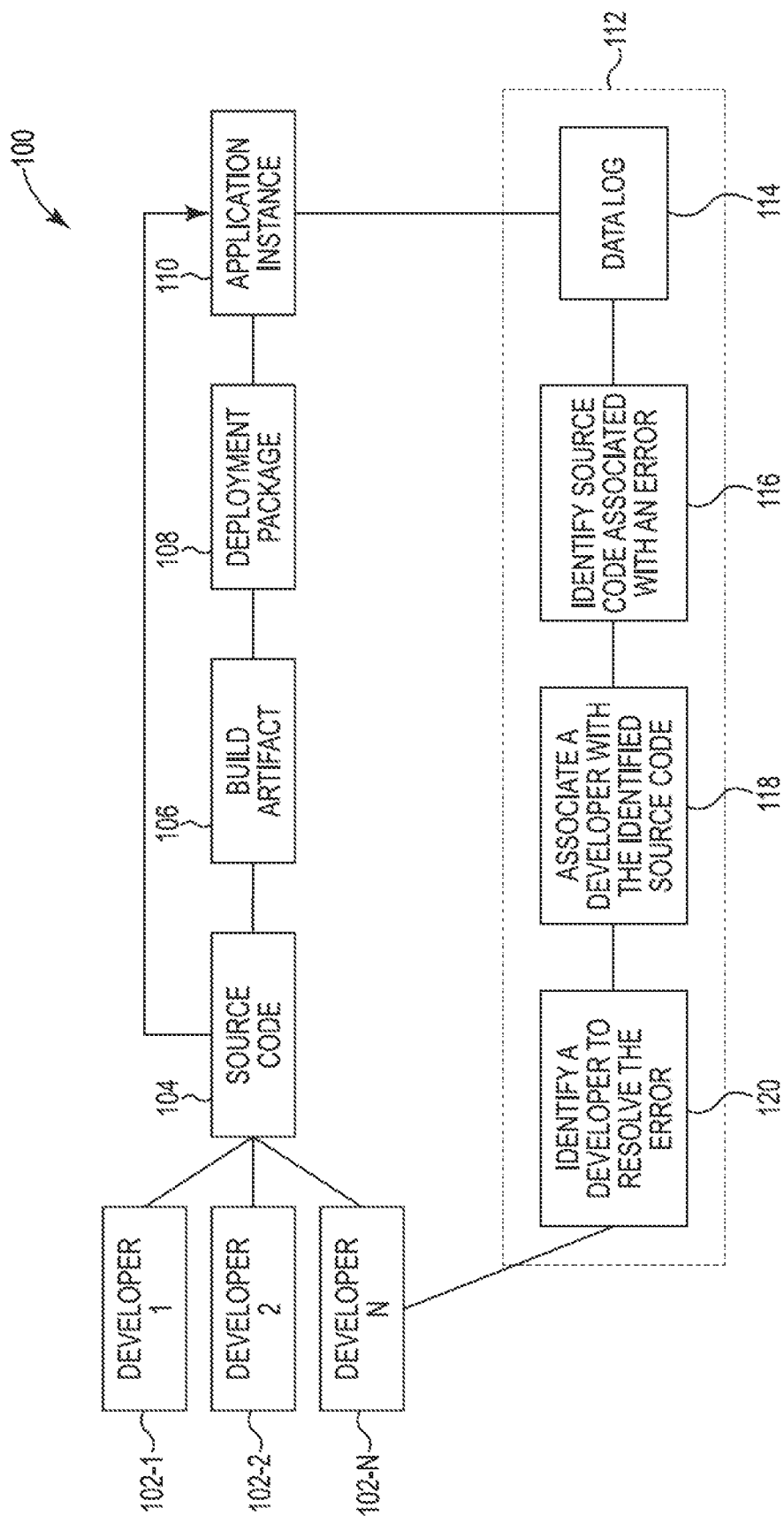
FIG. 1 illustrates a diagram of an example of a system for associating an application developer with an error according to the present disclosure.

FIG. 1 illustrates a diagram of an example of a system 100 for associating an application developer with an error according to the present disclosure. FIG. 1 depicts a system 100 that can include developers 102-1-102-N (hereinafter collectively referred to as 102), source code 104, a build artifact 106, a deployment package 108, and application instance 110, and an error developer association element 112 which can include component elements 114, 116, 118, and 120. The developer association element 112, and its component elements, can be a combination of hardware and machine readable medium (MRM) designedly implement their respective functions.

The developers 102 can include a number of people. For example, the developers 102 can include distributed source code developers. The developers 102 may foe individuals, groups of individuals, departments, geographical segments, organizational groups, etc.

There can be any number of developers 102 present within a system 100. The developers 102 can be working to produce an application (e.g. computer software application) and/or working on a previously developed application.

Producing an application can include developing an application by developing and/or transforming source code 104. Developing an application can trace a number of lifecycle stages. For example, life cycle stages can include source code 104 implemented by a developer, build artifacts (e.g. source code compiled for testing, executables, walk-throughs, inspections, and/or correctness proofs, etc.) 106 created by a build management system, a deployment package 108 which can include deployment artifacts, and/or an application instance 110 which can include utilization of deployment artifacts in the production environment.

The application instance 110 can be monitored in the production environment. Monitoring can include analyzing the data log element 114 associated with the application instance 110. The data log 114 can include logs (e.g. error logs that capture all the warning and errors encountered by a system). Logs can include portions of the code (e.g. units of code or rules being executed, messages being specifically written to the log, an event identifier, etc.) created by the developers 102 that are checked in (e.g. write and/or merge changes made in a working copy back in to a repository, committing, etc.) to source control systems together with the code changes of the developers 102. Logs can include error log messages wherein the error log message is associated with a thrown exception (e.g. signal that a routine could not execute normally, an input argument is invalid, a relied upon resource is unavailable, etc.) of the application instance 110. Logs can be collected (e.g. saved to an error log), for example, manually by application support teams and/or automatically using log analytics tools (e.g. NX Log Analyzer, Log Parser, etc.).

At element 116 input can be received. Receiving input can include receiving an error log message from the data log 114. Receiving an error log message from the data log 114, can include identifying an error log message within the data log 114 manually with an application support team or automatically using log analytics tools. Additionally or alternatively, receiving an error log message can include stripping away parameters from the error log message. Stripping away parameters from the error log message can include processing an error log message (e.g. manually by an application support person, automatically by log analytics tools, etc.) by stripping away parameters (e.g. processing the error log message to remove parameters not utilized by the system 100) leaving the log pattern (e.g. class:function: log_message).

Element 116 can identify source code associated with an error log message received from the data log 114. Identifying source code associated with an error log message can include identifying a class name and/or a function name in the error log message (e.g. Class1: foo( )→"failed to create foo entities," etc.).

Identifying source code associated with an error element can be based on a number of approaches. For example, identifying source code associated with an error element can be based on continuous scanning (e.g. constantly being scanned and analyzed) of the source code. Identifying source code associated with an error element can be based on continuous scanning of the source code can include continuously scanning during development of the source code. Continuously scanning the source code can include continuously scanning source code that is checked in with a source control system (e.g. revision control system, version control system, system collecting changes to data overtime, etc.). For example, continuously scanning source code checkedin with a source control system and building a mapping of class:function:log_message (e.g. the format defining the log message and/or building a mapping of logs of different verbosity levels). The log messages can be defected within the source code using identification of common patterns (e.g. particular patterns in the source code responsible for and/or indicating responsibility for a bug/error, particular pattering in the source code determined to be likely responsible for causing bugs/error based on mining information software revision histories, Logger.log(" . . . "), Exception. printStacktrace( )).

An additional or alternative approach to identifying source code associated with an error element can be based on ad-hoc scanning (e.g. as needed scanning, scanning in response to a specific issue or concern) of the source code. Ad-hoc scanning can include occasional scanning and/or with no set scanning pattern. Ad-hoc scanning can include looking for a specific log message. For example scanning the source code for a specific error log message (e.g. error log messages similar to those discussed above with regard to continuous scanning, log messages identified in an error log, etc.) detected during development of the source code.

Another alternative or additional approach to identifying source code associated with an error element can be based on monitoring tool detection. Monitoring tool detection can be applied during runtime of the application. Monitoring tool detection can include utilizing monitoring tools to detect when a log message has been produced. For example, a monitoring tool (e.g. HP Diagnostics) can use bytecode instrumentation techniques to detect when a log message has been produced. The monitoring tools can detect when a log message has been produced by a class (e.g. a programming construct that offers support for various class related features, data field descriptions associated with state variables at program run time, a programming construct whose behavior is defined using methods, Class1, etc.) collect details associated with the log message. The details can include function name (e.g. program fragment that receives an input, manipulates the input, and returns a result, foo( ), etc.). Alternatively or additionally, the details can includes complete call stack (e.g. a stack data structure that stores information about the active subroutines of a computer program, stack trace, a report of the active stack frames at a certain point of time in the execution of a program as part of an error report).

Element 118 can associate a developer 102 with a portion of the source code. Associating a developer with a portion of the source code can include associating a developer with a portion of source code identified as associated with an error by the identify source cede associated with an error element 116.

Associating a developer with a portion of source code can be based on a number of associating techniques. Associating techniques can include associating a developer with a portion of source code based on when that developer modified the source code. For example, whether the developer was the test developer to add or modify the portion of the source code associated with the log message and/or the function/class that the log message appears in. Alternatively or additionally, the association can include ranking an association between a number of developers and a portion of source code based on when each developer modified the portion of the source code. Ranking can include arranging the developers according to when each developer modified the source code, with developers who most recently modified the source code being arranged near the top of the list. The association can also include assigning a probability of association between a developer and a portion of source code. The probability can be based on when the developer modified the portion of source code, with the developers with the latest modifications receiving the highest probability of association.

Additionally or alternatively, associating techniques can also include associating a number of developers with portions of source code based on a developer having modified source code that is dependent on the component that logged the error log message. Source code that is dependent on the component that logged the error log message can be identified by recognizing the dependencies with developer productivity tools. The association can be based on when a developer modified a portion of dependent source code. For example the developer that last modified the dependent source code can be associated with the source code. Alternatively or additionally, the association can be based on ranking an association between a number of developers and a portion of source code based on when each developer modified the portion of dependent source code. Ranking can include arranging the developers according to when each developer modified the portion of dependent source code, with developers who most recently modified the portion of dependent source code being arranged near the top of the list. The association can also include assigning a probability of association between a developer and a portion of source code. The probability can be based on when the developer modified a portion of dependent source code, with the developers with the latest modifications receiving the highest probability of association.

Another associating technique can include associating a number of developers with portions of source code based on developer assignments. For example, a number of developers can be assigned to a specific component. That is, a number of developers can be assigned to call on-duty for specific portions of source code. As a result, a developer car be associated with a portion of source code identified as being associated with an error by virtue of being assigned to a component, portion of source code associated with the error, and/or portion of source code dependent on source code associated with an error.

Element 120 can identify a number of users to resolve the error underlying the error log message. Identifying a number of users to resolve the error underlying the error log message can include identifying the number of developers associated with the identified source code. This can include identifying the number of developers associated with the identified source code by the associate a developer with the identified source code element 118. Identifying a number of users can include communicating the identity of the identified user to a person and/or program responsible for assigning error correction. Alternatively or additionally, identifying a developer can include assigning a number of developers to correct the error. Assigning a number of developers can include transmitting information associated with the error log message to the identified developers.

Identifying a number of users can additionally or alternatively include compiling information about the developers. Compiling information about developers can include compiling statistics related to the developers associations to error log messages. For example, the compiled information can include statistics such as lists of developers with the highest number of error associations in a production environment. The compiled information can be used to develop correlations between particular developers and recurring errors and/or high incidences of error.

Figure 2:
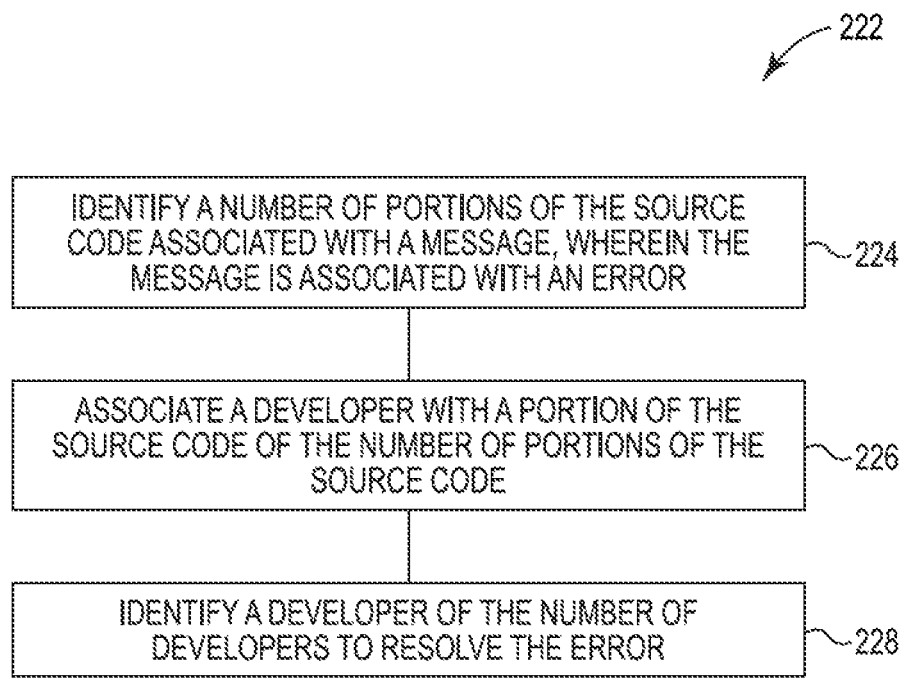
FIG. 2 illustrates a block diagram of an example method for associating an application developer with an error according to the present disclosure.

FIG. 2 illustrates a block diagram of an example method 222 for associating an application developer with an error according to the present disclosure. At 224 the method 222 can produce an identification of a number of portions of the source code associated with a message. This identification can be used as input for other steps in the method. At 224 the method 222 includes identifying a number of portions of the source code associated with a message. The message can itself be associated with an error. For example, the message can be a message included in an error log. For example, an exception (e.g. data structure storing information about an exception condition) can occur and an error log message can be generated and stored in a data log. The error log message can be received as a form of input for utilization in the identification. Identifying the number of portions of source code associated with a message can, therefore, include detecting a message associated with an exception. The number of portions of the source code associated with a message can include source code associated with particular portions of the message. The number of portions of the source code identified can be a particular one of a function or class associated with the portion of the source code. The number of portions of the source code associated with the message can include the number of portions of source code associated with portions of a message remaining after the message has been stripped of some parameters (e.g. removing and/or ignoring, through message processing, parameters often attached to log messages to leave the log pattern (e.g. class:function:log_message)).

Identifying a number of portions of the source code associated with a message can be based on a set of source code monitoring rules. For example, identifying a number of portions of the source code associated with a message can include scanning the source code to identify the message. That is, various types of scanning of the source code can be utilized to find the portions of the source code associated with a particular message. Scanning the source code can include continuously scanning the source code for a common pattern of the message. For example, during development of the code the source code under development can be continuously scanned for a common pattern (e.g. Logger.log(" . . . "), Exception.printStacktrace( )) that is associated with the error log message.

Alternatively or additionally, scanning of the source code to identify the message can include ad-hoc scanning the source code for the error log message detected. For example, during the development of code, the source code can be occasionally scanned looking for a specific detected log message. For example, as code is being produced and modified in a production environment occasional scans can be performed wherein the scans can search the source code for a particular log message identified in a data log.

Identifying a number of portions of the source code associated with a message can additionally or alternatively include reverse-engineering an association during runtime. Reverse engineering during runtime can include utilizing a monitoring tool (e.g. HP Diagnostics) to detect (e.g. via bytecode instrumentation techniques) when a log message has been produced. Detecting a log message being produced can include detecting by a class with details including function name and/or a complete stack. Using the information associated with such a detections (e.g. class with details including function name and/or a complete stack), the source code can be searched for portions of source code associated with the information.

At 226 the method 222 includes associating a developer with a portion of the source code of the number of portions of source code. Associating a developer with a portion of the source code of the number of portions of source code can be based on a set of source code monitoring rules. For example, a source code monitoring rule can include associating a developer with a portion of the source code of the number of portions of source code can be hosed on a modification of a portion of the source code of the number of portions of source code associated with a message. A number of the portions of source code associated with a message can, for example, be received as input from 224 of method 222. The portion of the source code can be one of a function (e.g. foo( ), etc.) or class (e.g. Class1, etc.) associated with the portion of the source code. Modifications to the portion of the source code can include when a modification occurred to a portion of the source code. For example, associating a developer with a portion of the source code of the number of portions of source code associated with a message can include associating a developer with a portion of the source code based on the developer having made the last modification of the portion of the source code. For example, an exception can be thrown resulting in an error log message, which has a number of portions of source code associated with it. Of the number of portions of source code a particular portion may have been modified by two different developers before the exception was thrown. The developer who was the last of the developers to have modified the particular portion may be the one associated with the portion of the number of portions of source code. However, the method 222 is not limited to associating developer with a portion of the source code based on the developer having made the last modification of the portion of the source code. 226 can associate a developer with a portion of the source code based on the developer having made the first and/or any intervening modification of the portion of the source code At 228 the method 222 includes identifying a developer of the number of developers to resolve the error. Identifying a developer of the number of developers to resolve the error can be based on the developer associations. For example the developer of a number of developers associated with a portion of the number of portions of the source code associated with the message can be identified as the developer to resolve the error associated with the message. The developer associated with a portion of the source code of the number of portions of the source code can be communicated to a number of people and/or software programs to utilize in error resolution and/or record compilation.

Identifying a developer of the number of developers to resolve the error car include assigning the error for resolution to the identified developer. Assigning the error for resolution can include sending information related to the error (e.g. error log message and/or identification of the number of portions of the source code associated with a message) to the developer and/or a project manager.

Figure 3:
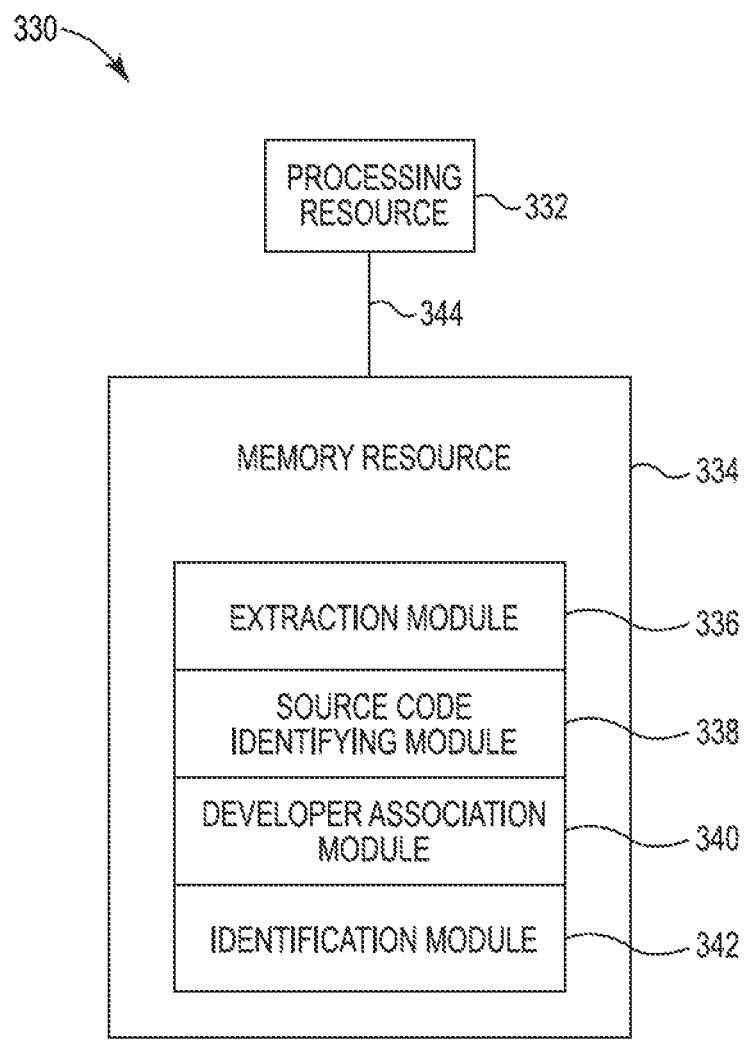
FIG. 3 illustrates a block diagram of an example system for associating an application developer with an error according to the present disclosure.

FIG. 3 illustrates a block diagram of an example system 330 for associating an application developer with an error according to the present disclosure. The system 330 can utilize software, hardware, firmware, and/or logic to perform a number of functions (e.g., identify a number of portions of the source code associated with the error log message, etc.). The system 330 can utilize software, hardware, firmware, and/or logic to perform any of the functions discussed in regard to FIG. 1 and FIG. 2.

The system 330 can be any combination of hardware and program instructions configured to perform the number of functions. The hardware, for example, can include a processing resource 332. Processing resource 332 may represent any number of processors capable of executing instructions stored by a memory resource (e.g., memory resource 334, machine readable medium, etc.). Processing resource 332 may be integrated in a single device or distributed across devices. The hardware, for example, can alternatively or additionally include a memory resource 334. Memory resource 334 can represent generally any number of memory components capable of storing program instructions (e.g., machine readable instructions (MRI), etc.) that can be executed by processing resource 332. Memory resource 334 can include non-transitory computer readable media. Memory resource 334 may be integrated in a single device or distributed across devices. Further, memory resource 334 may be fully or partially integrated in the same device as processing resource 332 or it may be separate but accessible to that device and processing resource 332. System 330 may be implemented on a user or client device, on a server device or collection of server devices, of on a combination of the user device and the server device or devices.

In one example, the program instructions can be part of an installation package that when installed can be executes by processing resource 332 to implement system 330. In this example, memory resource 334 can be a portable medium such as a CD, DVD, or flash drive or a memory maintained by a server from which the installation package can be downloaded and installed. In another example, the program instructions may be part of an application or applications already installed. Here, memory resource 324 can include integrated memory such as a hard drive, solid state drive, or other integrated memory devices.

The program instructions (e.g., machine-readable instructions (MRI)) can include a number of modules (e.g., 336, 338, 340, and 342) that include MRI executable by the processing resource 332 to execute an intended function (e.g., receive an error log message logged by a component, identify a number of portions of the source code associated with the error log message, etc). Each module (e.g., 336, 338, 340, and 342) can be a sub-module of other modules. For example, an extraction module 336 and source code identifying module 388 can be sub-modules and/or contained within the developer association module 340. In another example, the number of modules 336, 338, 340, and 342 can comprise individual modules on separate and distinct computing devices.

Extraction module 336 can include MRI that when executed by the processing resource 332 can receive a message. For example, receive an error log message logged by a component. The error log may be received from various sources, including a data log associated with an application under development.

Alternatively or additionally, extraction module 336 can include MRI that when executed fey the processing resource 332 can strip parameters from a message. For example, strip parameters from an error log message. Stripping parameters can include extracting a log pattern from an error log message. The extracted log pattern can include a stack (e.g. stack trace, traceable sequence of nested functions called up to a point of time, report of active stack frames up to a point in time, etc.) associated with the error log message. That is, extraction module 336 can include MRI that when executed by the processing resource 332 can extract a log pattern from an error log message, wherein the log pattern includes a stack.

Extraction module 336 can include MRI that when executed by the processing resource 332 also can divide the stack into a number of objects (e.g. data structures together with their associated processing routines, instances of classes, etc.). The stack can include the stack of the log pattern extracted from the error log message. The number of objects can include classes and functions. The classes and functions can be associated with a path from which the error log message is thrown.

Source code identifying module 338 can include MRI that when executed by the processing resource 332 can identify a number of portions of the source code associated with a message (e.g. an error log message). For example, source code identifying module 338 can include MRI that when executed by the processing resource 332 can determine a portion of the source code associated with the number of objects based on a set of source code monitoring rules. The objects can be the objects identified by execution of the MRI associated win extraction module 336. That is, the number of objects can include classes and functions associated with a path from which an error is thrown. Source code monitoring rules can include, but are not limited to, scanning the source code to identify the message (e.g. continuously for a common pattern associated with the number of objects, ad-hoc scanning the source code for the specific error log message defected, etc.) and/or utilize a monitoring tool to detect when a log message has been produced and then identify a source code associated with the objects of the error log message log pattern.

Additionally and or alternatively, source code identifying module 338 can include MRI that when executed by the processing resource 332 can associate a message with a type of error message. Associating a message can include associating an error log message with a type of error message. For example, source code identifying module 338 can include MRI that when executed by the processing resource 332 can associate an "OutOfMemoryError" message of an error log with a stack overflow type of error message.

Developer association module 340 can include MRI that when executed by the processing resource 332 can determine a developer associated with a portion of the source code. Determining a developer can include determining a developer associated with a portion of the source code associated with a number of objects. The source code associated with a number of objects can be associated with a number of objects based on a set of source code monitoring rules. Determining a developer associated with a portion of the source code can include determining a developer associated with a portion of the source code based on a set of developer mapping rules. Developer mapping rules can include, but are not limited to, associating the developer with the portion of the source code based on when the developer modified any objects of the path associated with the error log message. For example, a developer mapping rule can include associating the developer who last performed a modification of any object of the path associated with an error log message to the portion of the source code associated with the number of objects of the error log message.

Alternatively or additionally, developer association module 340 can include MRI that when executed by the processing resource 332 can associate a developer with a number of portions of the source code associated with a message (e.g. error log) based on a relationship between the developer and the number of portions of the source code. A relationship between the developer and the number of portions of the source code can include, but is not limited to, an assignment of the developer with relation to the number of portions of source code and/or modifications of source code. For example, a developer can be associated with a number of portions of the source code associated with an error log message based on the based on the developer being assigned to the number of portions of the source code. Being assigned can include being call on-duty. In an alternative or additional example, a relationship between the developer and the number of portions of the source code can include the developer modifying (e.g. last modifying) another portion of the source code (e.g. a portion or the source code other than the number of portions associated with the error log message) which is dependent on the number of portions of the source code associated with the error log message.

Developer association module 340 can also include MRI that when executed by the processing resource 332 can determine whether a modification performed by a developer is associated with the type of error message associated with the error log message. For example, developer association module 340 can include MRI that when executed by the processing resource 332 can receive an association of an error log message (e.g. OutOfMemoryError, etc.) with a type of error message (e.g. stack overflow). Developer association module 340 can include MRI that when executed by the processing resource 332 can determine whether the types of modifications performed by developers are associated with the type of error message (e.g. stack overflow) associated with the error log message.

Developer association module 340 can also include MRI that when executed by the processing resource 332 can associate the developer with the error log message. Associating the developer with the error log message can include associating the developer with the error log message based on the modification performed by the developer being associated with the type of error massage. For example, if the error log message (e.g. OutOfMemoryError, etc.) is of the stack overflow type and the modification made by the developer is the type of modification associated with stack overflow error types, then the error log message (e.g. OutOfMemoryError, etc.) can be associated with the developer.

Developer association module 340 can include MRI that when executed by the processing resource 332 can identify a developer to resolve an error associated with an error log message. Identifying a developer can include identifying a developer associated with a number of portions of source code associated with the error log message. For example, identifying the developer can include receiving an association between a number of portions of source code and an error log message and the accompanying association between that number of portions of the source code and a developer based on the developer's relationship with the number of portions of the source code. The associations can then be used to identify the corresponding developer associated with the error log message. The identified developer can then be communicated to a parson or software program to assign correction of the error associated with the error log message to the identified developer.

Alternatively or additionally, developer association module 340 can include MRI that when executed by the processing resource 332 can associate a developer with an object. An object can include an object (e.g. extracted classes and functions associated with a path from which an error log message is thrown) associated with a portion of source code. Associating the object with the developer can include associating the developer associated with the portion of source code associated with object, wherein the association is based on a set of developer mapping rules.

The memory resource 334, as described herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, electrically erasable programmable read-only memory (EEPROM), etc., as well as other types of machine-readable media.

The memory resource 334 can be integral and/or communicatively coupled to a computing device in a wired and/or a wireless manner. For example, the memory resource 334 can be an internal memory, a portable memory, a portable disk, and/or a memory associated with another computing resource (e.g., enabling MRIs to be transferred and/or executed across a network such as the Internet).

The memory resource 334 can be in communication with the processing resource 332 via a communication path 344. The communication path 344 can be local or remote to a machine (e.g., a computer) associated with the processing resource 332. Examples of a local communication path 344 can include an electronic bus internal to a machine (e.g., a computer) where the memory resource 334 is one of volatile, non-volatile, fixed, and/or removable storage medium in communication with the processing resource 332 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 344 can be such that the memory resource 334 is remote from the processing resource 332 such as in a network connection between the memory resource 334 and the processing resources (e.g., 332). That is, the communication path 344 can be a network connection. Examples of such a network connection can include a local area network (LAN), a wide area network (WAN), a personal area network (PAN), and the internet, among others. In such examples, the memory resource 334 can be associated with a first computing device and a processor of the processing resource 332 can be associated with a second computing device (e.g., a Java® server). For example, a processing resource 332 can be in communication with a memory resource 334, where the memory resource 334 includes a set of MRI and where the processing resource 332 is designed to carry our the set of MRI.

As used herein, "logic" is an alternative and/or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

It is to be understood that the descriptions presented herein have been made in an illustrative manner and not a restrictive manner. Although specific examples for systems, methods, computing devices, and instructions have been illustrated and described herein, other equivalent component arrangements, instructions, and/or device logic can be substituted for the specific examples presented herein without departing from the spirit and scope of the present disclosure.

What is claimed:

1. A method comprising:
building a mapping of classes and functions of log messages to a source code of an application;
receiving an error log message;
identifying, by a processor, a portion of the source code associated with the error log message based on a class name and a function name of the error log message, including scanning the source code based on the class name and function name of the error log message and identifying a common pattern in the source code responsible for an error in the error log message;
identifying, by the processor, a plurality of developers associated with the portion of the source code associated with the error log message based on a set of developer mapping rules;
identifying, by the processor, one of the plurality of developers associated with the portion of the source code to resolve the error in the error log message;
associating the error log message with a type of error message;
determining that a modification performed by the developers is associated with the type of error message; and
associating the developers with the error log message based on the modification performed by the developers being associated with the type of error message.

2. The method of claim 1, wherein the set of developer mapping rules includes associating one of the developers with the portion of the source code based on the developer performing a last modification to the portion of the source code.

3. The method of claim 1, wherein the method includes identifying a number of developers associated with the portion of the source code based on a modification of the portion of the source code.

4. The method of claim 3, wherein the portion of the source code includes a function associated with the portion of the source code.

5. The method of claim 3, wherein the modification includes the last modification of the portion of the source code.

6. The method of claim 1, wherein identifying the portion of the source code associated with the error log message includes detecting a message associated with an exception.

7. A non-transitory computer-readable medium storing a set of instructions that, when executed, cause a processing resource to:
build a mapping of classes and functions of log messages to a source code of an application;
receive an error log message;
identify a portion of the source code associated with the error log message based on a class name and a function name of the error log message, including scanning the source code based on the class name and function name of the error log message and identifying a common pattern in the source code responsible for an error in the error log message;
identify developers associated with the portion of the source code associated with the error log message based on a set of developer mapping rules;
identify one of the developers to resolve the error in the error log message;
associate the error log message with a type of error message;
determine that a modification performed by the developers is associated with the type of error message; and
associate the developers with the error log message based on the modification performed by the developers being associated with the type of error message.

8. The non-transitory computer-readable medium of claim 7, wherein the set of developer mapping rules includes associating one of the developers with the portion of source code based on the developer performing a last modification to the portion of the source code.

9. A system comprising:
a processing resource; and
a memory storing a set of instructions that when executed by the processing resource cause the processing resource to:
build a mapping of classes and functions of log messages to a source code of an application;
receive an error log message;
extract a pattern from the error log message, wherein the pattern includes a stack;
divide the stack into a number of objects, wherein the objects include classes and functions associated with a path from which the error log message is thrown;
determine a portion of the source code associated with the number of objects based on a class name and a function name of the error log message, including scanning the source code based on the class name and function name of the error log message and identifying a common pattern in the source code responsible for an error in the error log message;
determine developers associated with the portion of the source code based on a set of developer mapping rules;
associate the developers with the error log message;
identify one of the developers to resolve the error in the error log message;
associate the error log message with a type of error message;
determine that a modification performed by the developers is associated with the type of error message; and
associate the developers with the error log message based on the modification performed by the developers being associated with the type of error message.

10. The system of claim 9, wherein the set of developer mapping rules includes associating one of the developers with the portion of source code based on the developer performing a last modification to any of the objects of the path.

* * * * *